United States Patent
Nishida

(10) Patent No.: US 7,667,807 B2
(45) Date of Patent: Feb. 23, 2010

(54) IN-PLANE-SWITCHING-MODE LIQUID CRYSTAL DISPLAY DEVICE

(75) Inventor: Shinichi Nishida, Kanagawa (JP)

(73) Assignee: NEC LCD Technologies, Ltd. (JP)

( * ) Notice: Subject to any disclaimer, the term of this patent is extended or adjusted under 35 U.S.C. 154(b) by 271 days.

(21) Appl. No.: 11/460,556

(22) Filed: Jul. 27, 2006

(65) Prior Publication Data

US 2007/0024791 A1 Feb. 1, 2007

(30) Foreign Application Priority Data

Jul. 29, 2005 (JP) ............................. 2005-221390

(51) Int. Cl.
*G02F 1/1343* (2006.01)
(52) U.S. Cl. ...................................... 349/141; 349/138
(58) Field of Classification Search .................. 349/141
See application file for complete search history.

(56) References Cited

U.S. PATENT DOCUMENTS 6,707,523 B2 * 3/2004 Oota et al. .................. 349/141
7,139,043 B2 * 11/2006 Kwon et al. ................... 349/39
2002/0008829 A1 1/2002 Matsumoto .................. 349/141
2002/0186339 A1 * 12/2002 Hirakata et al. ............. 349/141
2005/0237465 A1 * 10/2005 Lu et al. ...................... 349/141

FOREIGN PATENT DOCUMENTS

JP 2004-062145 2/2004

* cited by examiner

*Primary Examiner*—Richard H Kim
(74) *Attorney, Agent, or Firm*—Hayes Soloway P.C.

(57) ABSTRACT

An IPS-mode LCD device includes a TFT substrate and a counter substrate sandwiching therebetween a LC layer. Each pixel includes a pixel electrode covered by a passivation film formed on the TFT substrate, and a common electrode formed on the top surface of the passivation film. The passivation film has a first thickness at a portion in contact with the common electrode and a second thickness smaller than the first thickness at a portion in contact with the pixel electrode, thereby having a flat top surface of the passivation film.

8 Claims, 8 Drawing Sheets

IN-PLANE-SWITCHING-MODE LIQUID CRYSTAL DISPLAY DEVICE

BACKGROUND OF THE INVENTION (a) Field of the Invention

The present invention relates to an in-plane-switching-mode (IPS-mode) liquid crystal display (LCD) device and, more particularly, to an IPS-mode LCD device having a uniform electric field in each pixel. The present invention also relates to a method for manufacturing a LCD device.

(b) Description of the Related Art

The LCD devices are categorized into two modes including: a first mode wherein orientation of liquid crystal (LC) molecules in the LC layer is rotated in the direction normal to the surface of the substrates sandwiching therebetween the LC layer; and a second mode wherein orientation of LC molecules are rotated in the direction parallel to the surface of the substrates (substrate surface). The first modes include a twisted-nematic-mode (TN-mode) LCD device as a typical example, and the second modes include an IPS-mode LCD device as a typical example.

In the TN-mode LCD device, since the LC molecules are rotated and deviated from the plane normal to the substrate surface, the polarization angle of the light passed by the LC layer deviates along with the increase of the viewing angle to achieve only a limited viewing angle characteristic. On the other hand, in the IPS-mode LCD device, since the LC molecules are rotated in the plane normal to the substrate surface, polarization angle of the light does not change even with a larger viewing angle, to thereby achieve a wider viewing angle characteristic. Thus, an increased number of 10 IPS-mode LCD devices are employed.

It is noted here that the IPS-mode LCD devices include a first type wherein a pair of electrodes in each pixel are disposed on the common surface of an insulation film, and a second type wherein the pair of electrodes in each pixel are disposed on opposite surfaces of an insulation film. The second-type LCD device is shown in FIG. 7.

The LCD device of FIG. 7 includes a thin-film-transistor (TFT) substrate 10 disposed on the light-incident side of the LC layer 30 and a counter substrate 20 disposed on the light emitting side of the LC layer 30. The TFT substrate 10 includes a passivation film 17 having a bottom surface on which a common electrode 19 is formed and a top surface on which a pixel electrode 16 is formed.

FIG. 8A shows an arrangement of the pixel electrode 16 and common electrode 19 in a pixel of the LCD device of FIG. 7. FIG. 7 corresponds to a sectional view taken along line VII-VII in FIG. 8A. The pixel electrode 16 and common electrode 19 oppose each other in the lateral direction of the pixel in FIG. 8A. Since the pixel electrode 16 and common electrode 19 sandwich therebetween the passivation film 17, as described above, both the electrodes 19 and 16 may overlap each other as viewed normal to the substrate surface.

FIG. 8B shows a pixel of the first-type IPS-mode LCD device, generally designated by numeral 201, wherein both the pixel electrode 16 and common electrode 19 are formed on the common surface of an insulation film. In the structure of FIG. 8B, the pixel electrode 16 and common electrode 19 have therebetween a specific gap as viewed normal to the substrate surface for avoiding a short-circuit failure The structure of FIG. 8A has an advantage that the pixel electrode 16 has a larger capacitance with respect to the common electrode 19, which improves the charge storage capability thereof. The structure of FIG. 8A has another advantage that the lateral electric field applied to the LC layer increases in the vicinity of the edge of the electrodes 16, 19, thereby increasing a light transmission factor during display of a bright state.

The arrangement of the LCD device such as shown in FIGS. 7 and 8A is described in Patent Publication JP-2004-62145A, for example.

In the LCD device 200 of FIG. 7, the passivation film 17 should have an insulation function sufficient to withstand the voltage between the pixel electrode 16 and the common electrode 19. If the thickness of the passivation film 17 has a wide range of variation, and thus has a thickness in a pixel or pixels below a required range for withstanding a voltage applied between the pixel electrode 16 and the common electrode 19, a breakdown of the passivation film 17 will result in the pixel or pixels suffering a defect known as "a point defect" in the LCD device.

On the other hand, if the passivation film 17 has a thickness greater than the required range, the voltage to be applied to the LC layer 30 is reduced by the passivation films 17, whereby the passivation film 17 may prevent a sufficient lateral electric field from being applied to the LC layer 30. For avoiding such a scenario to impact the lateral electric field, higher voltage must be applied between the pixel electrode 16 and the common electrode 19, which increases the power dissipation of the LCD device.

In addition, the passivation film 17 having a larger thickness provides a wider range of variation in the lateral electric field applied to the LC layer 30. This variation causes a wider range of variation in the storage function for the electric charge among the pixels, which may create a flicker or residual image in the LCD device.

SUMMARY OF THE INVENTION

In view of the above problems in the conventional s techniques, it is an object of the present invention to provide an IPS-mode LCD device which is capable of assuring a suitable withstand voltage between the electrodes in the pixels, reducing the power dissipation of the LCD device, and suppressing the flicker or residual image in the LCD device.

The present invention provides a liquid crystal display (LCD) device including a liquid crystal (LC) layer, and first and second substrates sandwiching therebetween the LC layer to define a plurality of pixels, the first substrate including a first electrode and a second electrode in each of the pixels to apply the LC layer with a lateral electric field, wherein: the first substrate mounts thereon a transparent insulation film; the first electrode is formed on a first surface of the transparent insulation film near the LC layer, the second electrode is formed on a second surface of the transparent insulation film far from the LC layer; and the transparent insulation film has a first thickness (D1) at a location in contact with the first electrode, and a second thickness (D2) smaller than the first thickness at a location in contact with the second electrode.

The present invention provides a method for fabricating a liquid crystal display (LCD) device including a liquid crystal (LC) layer, and first and second substrates sandwiching therebetween the LC layer to define a plurality of pixels, the first substrate including a first electrode and a second electrode in each of the pixels to apply the LC layer with a lateral electric field, the method including the steps of: forming the second electrode on the first substrate; forming a transparent insulation film on the second electrode; forming a transparent conductive film on the transparent insulation film; forming a mask pattern having a first thickness (D1) on the transparent conductive film; patterning the transparent conductive film by using the mask pattern as an etching mask to form the first electrode; and selectively etching the transparent insulation film by using the mask pattern as an etching mask to obtain a first portion of the transparent insulation film having a second thickness (D2) smaller than the first thickness.

In accordance with the LCD device of the present invention and a LCD device manufactured by the method of the present invention, the configuration wherein the transparent insulation film has a smaller thickness at the location in contact with the second electrode intensifies the electric field applied from the first electrode and the second electrode to the LC layer through the transparent insulation film, without a significant reduction in the withstand voltage of the transparent insulation film, and reduces the range of variation in the electric field applied to the LC layer, thereby suppressing the flicker or residual image of the LCD device.

The above and other objects, features and advantages of s the present invention will be more apparent from the following description, referring to the accompanying drawings.

PREFERRED EMBODIMENT OF THE INVENTION

Figure 1A:
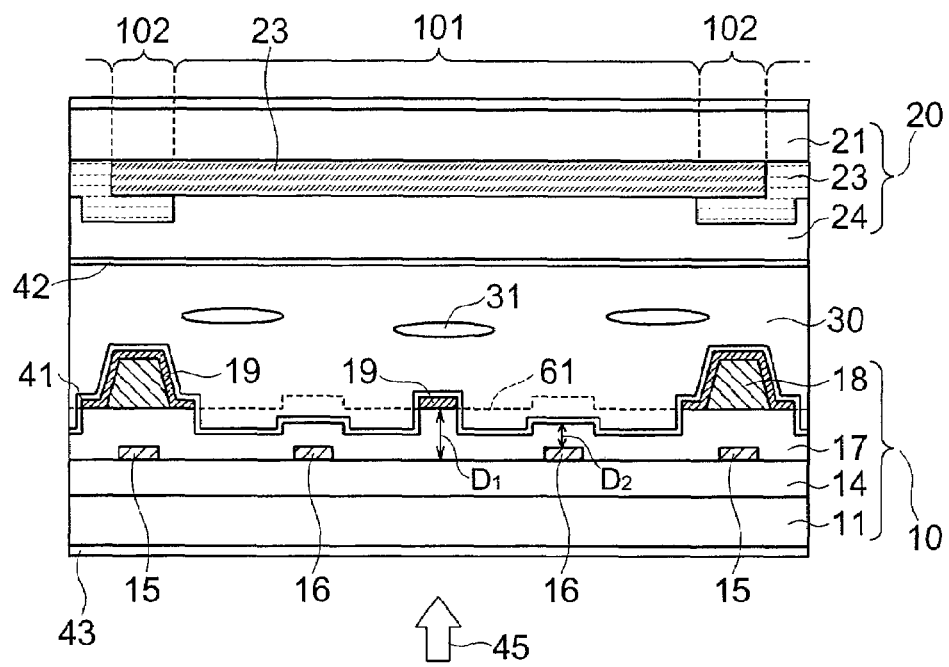
FIGS. 1A and 1B are a sectional views of an IPS-mode LCD device according to a first embodiment of the present invention, taken along a row direction and a column direction, respectively, of an array of pixels.
Figure 1B:
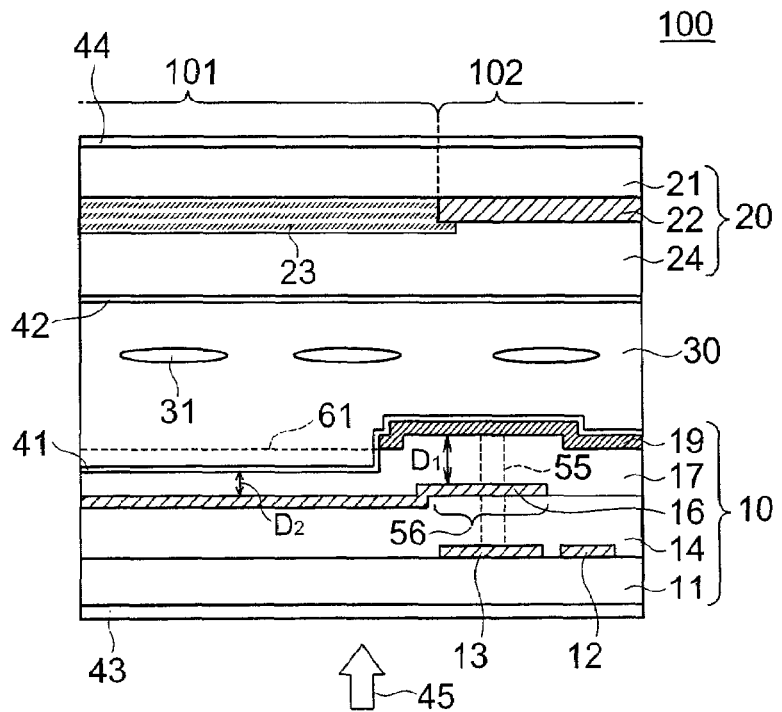

Now, the present invention is more specifically 10 described with reference to accompanying drawings, wherein similar constituent elements are designated by similar reference numerals throughout the drawings. FIGS. 1A and 1B show an active-matrix IPS-mode LCD device according to the first embodiment of the present invention.

The LCD device, generally designated by numeral 100, includes an array of pixels 101, one of which is shown in FIGS. 1A and 1B. The LCD device 100 includes a TFT substrate 10 and a counter substrate 20 sandwiching therebetween a LC layer 30 including LC molecules 31 therein. The LCD device 100 is disposed in front of a backlight source (not shown), with a counter substrate 20 being disposed on the front side of the LC layer 30. Each pixel 101 has a light switching function for transmitting the backlight 45 emitted by the backlight source. The light switching function of each pixel 101 is controlled by a corresponding TFT (not shown) formed on the TFT substrate 10. The counter substrate 20 mounts thereon color filters 23 for respective pixels and a black matrix 22 defining a light-shield area 102.

The TFT substrate 10 includes a glass substrate body 11. A plurality of scanning lines 12 and a plurality of common lines 13 extend on the glass substrate body 11 in the row direction within the light-shield area 102, and are covered by a gate insulation film 14. A plurality of data lines 15 extend on the gate insulation film 14 in the column direction within the light-shield area 102. Pixel electrodes 16 are also formed from the conductive layer configuring the data lines 15.

The scanning lines 12, common lines 13, data lines 15 and pixel electrodes 16 are made of a metallic material. The data lines 13 and pixel electrodes 16 should have a suitable thickness in view of a flat top surface of the overlying insulation films and a lower electric resistance thereof, and preferably have a thickness of 150 to 250 nm, (e.g., 200 nm).

A passivation film 17 covers the data lines 15 and pixel electrodes 16 on the gate insulation film 14. On the passivation film 17, patterned organic stripes 18 having a relatively large thickness extend in the column direction while overlapping the data lines 15 as viewed normal to the substrate surface. Common electrodes 19 made of a transparent conductive material, e.g., indium-tin-oxide (ITO), cover the patterned organic stripes 18 and the passivation film 17.

ITO has a relatively higher electric resistivity compared to the metallic material. Thus, the metallic material configuring the common lines 13 reduces the overall resistance of the common electrodes 19 and the common lines 13, thereby suppressing a delay in the signal transfer. The patterned organic stripes 18 may have a thickness as large as around 1.5 µm reduce a coupling capacitance between the data lines 15 and the common electrodes 19. The patterned organic stripes may have a thickness of 0.3 to 3 µm.

The counter substrate 20 includes a glass substrate body 21, on which a portion of the black matrix 22 extends in the row direction to configure part of the light-shield area 102, wherein the scanning lines 12 and the common lines 13 extend. Color filters 23 cover the area of the pixels 201 and part of the black matrix 22. Edges of the adjacent color filters 23 overlap each other to configure part of the light-shield area 102 extending in the column direction. An overcoat film 24 is formed on the black matrix 22 and color filters 23.

Orientation films 41, 42 are formed on the outermost surface of the TFT substrate 10 and counter substrate 20, respectively, opposing the LC layer 30. The orientation film 41, 42 are subjected to rubbing in the directions parallel to each other before fabrication of the LCD device 100, whereby the LC molecules 31 in the LC layer 30 are homogeneously oriented in the rubbing direction in the initial state thereof. A pair of polarizing films 43, 44 are disposed in cross-nicols to one another on the light-incident side of the TFT substrate 10 and the light-emitting side of the counter substrate 20, respectively. The polarizing film 43 on the TFT substrate 10 has a light absorption axis coinciding with the direction of the initial orientation of the LC molecules 31.

Figure 2:
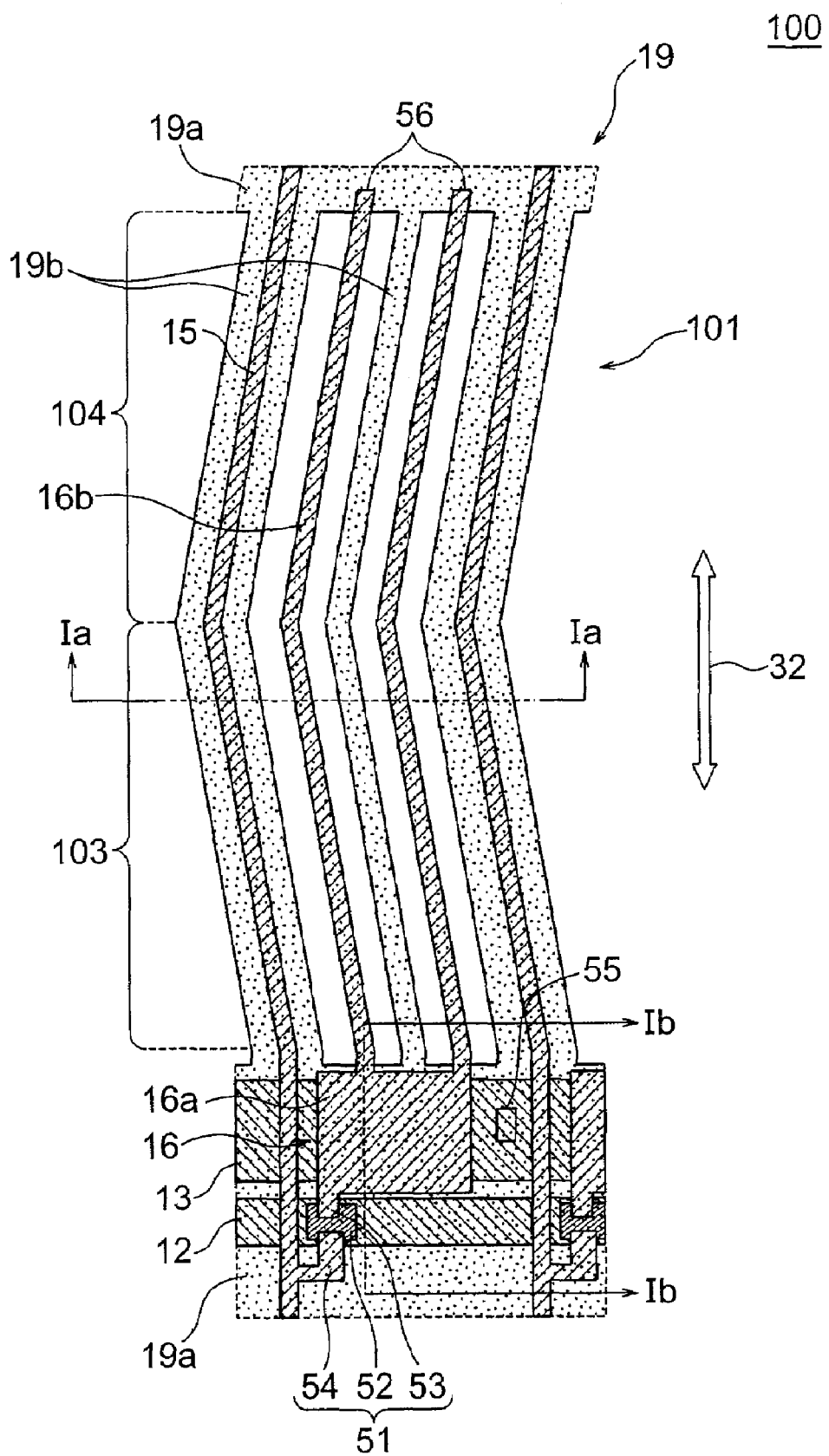
FIG. 2 is a top plan view of a pixel in the LCD device of is the first embodiment.

FIG. 2 shows the arrangement of the electrodes in each 10 pixel 201. FIGS. 1A and 1B correspond to sectional views taken along lines Ia-Ia and Ib-Ib, respectively, in FIG. 2. Each scanning line 12 and each common line 13 extend in the row direction of the array of pixels between adjacent pixels 101. Each data line 15 extends in the column direction between adjacent pixels 101.

In the vicinity of each intersection between the scanning lines 12 and data lines 15, there is provided a TFT 51 for driving a corresponding pixel 101. The TFT 51 includes an island semiconductor layer 52, source/drain electrodes 53, 54 and a part of scanning lines 12 configuring the gate electrode.

The source electrode 53 is connected to the pixel electrode 16, the drain electrode 54 is connected to a corresponding data line 15. The common lines 13 are connected to the overlying common electrodes 19 via plugs 55 formed in the passivation film 17 and gate insulation film 14.

The pixel electrode 16 includes a lead portion 16a extending from the source electrode 53, and a plurality of branch lines 16b extending parallel to one another from the lead portion 16a within the pixel 101. The common electrode 19 includes a lead portion 19a common to a row of pixels 101, and a plurality of branch lines 19b extending parallel to one another from the lead portion 19a within the pixel 101. The lead portion 16a, 19a and corresponding branch lines 16b, 19b configure a comb shape. The branch lines 16b and the branch lines 19a apply therebetween a corresponding part of the LC layer 30 with a lateral electric field. Some of the branch lines 19b overlap the data lines 15 as viewed normal to the substrate surface to thereby shield the electric field generated by the data lines 15.

The lead portion 16a of the pixel electrode 16 overlaps part of the common line 13 as viewed normal to the substrate surface, whereas the lead portion 19a of the common electrode 19 overlaps part of the scanning line 12 and common line 13 as viewed normal to the substrate surface. The lead portion 16a of the pixel electrode 16 involves a coupling capacitor in connection with the underlying common line 13 and the overlying lead portion 19a of the common electrode 19, the coupling capacitor having a charge storage function.

The orientation films 41, 42 have a rubbing direction 32, which coincides with the column direction of the pixels 101. The data lines 15, branch lines 16b of the pixel electrodes 16, and branch lines 19b of the common electrodes 19 extend in a 5 direction having a specific angle with respect to the rubbing direction 32, and have a symmetric structure with respect to the central line thereof in the column direction. More specifically, those electrode lines extend in the direction a specific angle deviated from the rubbing direction 32 in the counter-clockwise direction in the first half area 103 of the pixel 101 near the TFT 51, whereas those electrode lines extend in the direction the specific angle deviated from the rubbing direction 32 in the clockwise direction in the second half area 104 of the pixel 101 far from the TFT 51. The edge 56 of the branch lines 16b of the pixel electrode 16 overlaps the lead portion 19a of the common electrode 19 as viewed in the direction normal to the substrate surface.

In an initial state of the pixel 101 wherein no voltage is applied between the pixel electrode 16 and the common electrode 19, the LC molecules 31 are oriented parallel to the absorption axis of the polarizing film 43 on the TFT substrate 10, whereby the light incident onto the TFT substrate 10 cannot pass through the LC layer 30 toward the counter substrate 20.

Upon application of a specific voltage between the pixel electrode 16 and the common electrode 19 by the function of the TFT 51, the LC molecules 31 in a corresponding portion are rotated in a plane parallel to the substrate surface due to the lateral electric field generated by the specific voltage. The light incident onto the TFT substrate 10 is allowed to pass through the LC layer 30 toward the counter substrate 20 due to the birefringence of the LC layer 30, and is controlled for the light intensity of the transmitted light, by controlling the magnitude of the 10 voltage and thus the rotational angle of the LC molecules 31.

The symmetric structure of the electrode lines in the pixel 101 generates a symmetric electric field with respect to the central line, thereby rotating the LC molecules 31 in opposite rotational directions in the first half area 103 and second half area 104 of the pixel 101. In this rotation, both the first and second half areas 103, 104 compensate each other in the optical characteristic of the transmitted light, to improve the optical characteristic of the LCD device 100 as observed in a slanted viewing direction.

Referring again to FIGS. 1A and 1B, in the LCD device 100 of the present embodiment, the portion of the passivation film 17 on which the common electrode 19 is formed has a thickness (D1) of 300 nm, and the other portion of the passivation film 17 has a thickness (D2) of 100 nm. The larger-thickness portion of the passivation film 17 provides a higher withstand voltage between the pixel electrode 16 and the common electrode 19. The smaller-thickness portion of the passivation film 17 intensifies the lateral electric field applied to the LC layer 30, to thereby reduce the voltage to be applied between the pixel electrode 16 and the common electrode 19 and thus reduce the power dissipation of the LCD device 100. Numeral 61 shown in FIGS. 1A and 1B depicts a portion of a transparent insulation film (silicon nitride film) removed in a fabrication process to configure the 10 passivation film 17 having different thicknesses D1 and D2.

In the LCD device 100 of the present embodiment, the smaller-thickness portion of the passivation film 17 reduces the distance between the pixel electrode 16 and the LC layer 30, thereby reducing the range of variation in the electric field applied to the LC layer 30. This reduces variation of the electric charge stored in the interface between the orientation film 41 and the LC layer 30 among the pixels, thereby suppressing flicker and residual image.

According to the study by the inventor, the relationship 20 between film thicknesses D1 and D2 satisfying D2<D1−40 (nm) assured a stable withstand voltage between the pixel electrode 16 and the common electrode 19, an effectively reduced voltage within the passivation film 17, and a reduced range of variation of the electric field in the LC layer 30 among the pixels. It is preferable that D1 be 150 nm or above, and that D2 be 100 nm or below for achieving a reduced voltage within the passivation film 17 and a reduced range of variation of the electric field in the LC layer 30 among the pixels.

A fabrication process for the LCD device of FIGS. 1A and 1B will be described hereinafter. A metallic film is deposited on a glass substrate body 11 by sputtering, followed by patterning thereof to form data lines 12 and common lines 13 (refer to FIG. 1B). The metallic film may be 10 made of chrome, for example.

A gate insulation film 14, an undoped amorphous silicon film and an n-type amorphous silicon film are consecutively deposited using a plasma-enhanced chemical vapor deposition (PECVD) technique to a thickness of 400 nm, 200 nm and 30 nm, respectively. Subsequently, a dry-etching process is conducted to pattern the amorphous silicon films to form island semiconductor layers 52 for respective TFTs 51 (FIG. 2).

Thereafter, a metallic film is deposited on the island 20 semiconductor layers 52 and gate insulation film 14 by sputtering, followed by patterning thereof to configure data lines 15, pixel electrodes 16, source electrodes 53 and drain electrodes 54. The metallic film may be made of chrome, for example.

Subsequently, a silicon nitride film is deposited on the data lines 15, pixel electrodes 16, source electrodes 53, drain electrodes 54 and gate insulation film 14 to a thickness of 300 nm. A 1.5-μm in-thick photosensitive acrylic film is then formed on the silicon nitride film by coating, exposed to light and developed using a developing solution to configure patterned organic stripes 18.

Figure 3A:
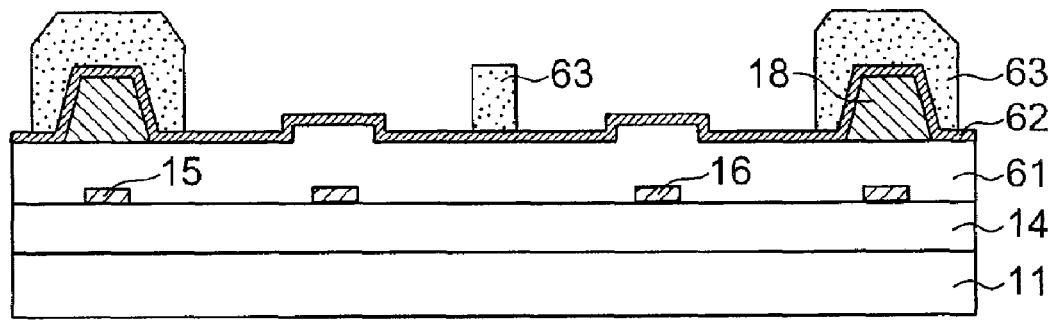
FIGS. 3A to 3C are sectional views of the LCD device of the first embodiment in consecutive steps of fabrication thereof.
Figure 3B:
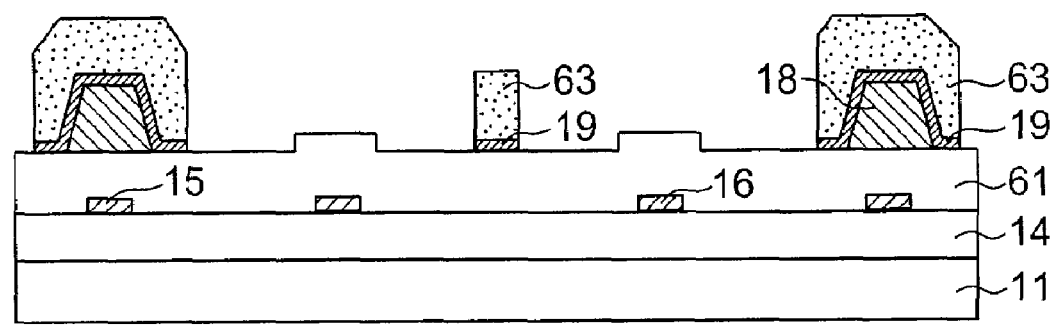
Figure 3C:
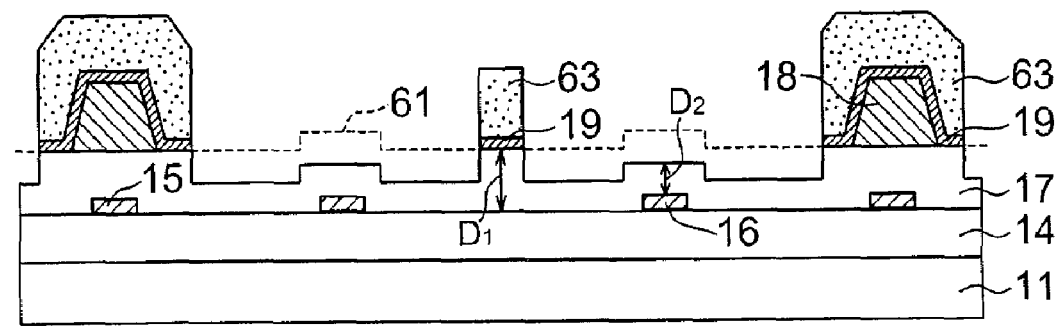

Subsequently, through-holes are formed in the silicon nitride film 61 and gate insulation film 14 by using a selective etching technique. FIGS. 3A to 3C consecutively show subsequent steps of the fabrication. These figures correspond to the location of FIG. 1A. As shown in FIG. 3A, an ITO film 62 is then deposited on the silicon nitride film 61 and within the through-holes by sputtering. A photoresist mask pattern 63 is then formed on the ITO film 62 by using a known photolithographic and etching technique, and used for patterning the ITO film 62 to configure plugs filling the through-holes and common electrodes 19, as shown in FIG. 3B.

Thereafter, a top portion of the silicon nitride film 61 20 having a thickness of 200 nm is removed by etching using the resist mask 63 as an etching mask, as shown in FIG. 3C. This step provides a passivation film 17 having a thickness (D1) of 300 nm at the portion in contact with the common electrode 19, and a thickness (D2) of 100 nm at the other portion. The resist mask 63 is then removed to achieve the TFT substrate 10.

Separately from the TFT substrate 10, a counter substrate 20 is formed by using a known technique. Both the substrates 10, 20 are then provided with respective orientation films 41, 42, which are subjected to a rubbing treatment in a specified direction. The resultant substrates 10, 20 are then bonded together using a sealing member at the periphery of the substrates 10, 20, with spacers being sandwiched therebetween to form a gap. A LC material is then injected into the gap through an injection port to form a LC layer 30, and the injection port is then plugged.

Polarizing films 41, 42 are then bonded onto the light-incident surface of the TFT substrate 10 and the light-emitting surface of the counter substrate 20. The polarizing film 43 on the TFT substrate 10 has a light-absorbing axis aligned with the initial orientation of the LC molecules 31, and both the orientation films 43, 44 are disposed in crossnicols with each other. Driver ICs and signal processing boards are then bonded onto the TFT substrate 10 for driving the TFTs, whereby the final structure of the LCD device of the present embodiment is obtained.

The above process uses the resist mask 63, which is used for patterning the common electrodes 19, during forming the different thicknesses of the passivation film 17, thereby simplifying the fabrication process.

Figure 4:
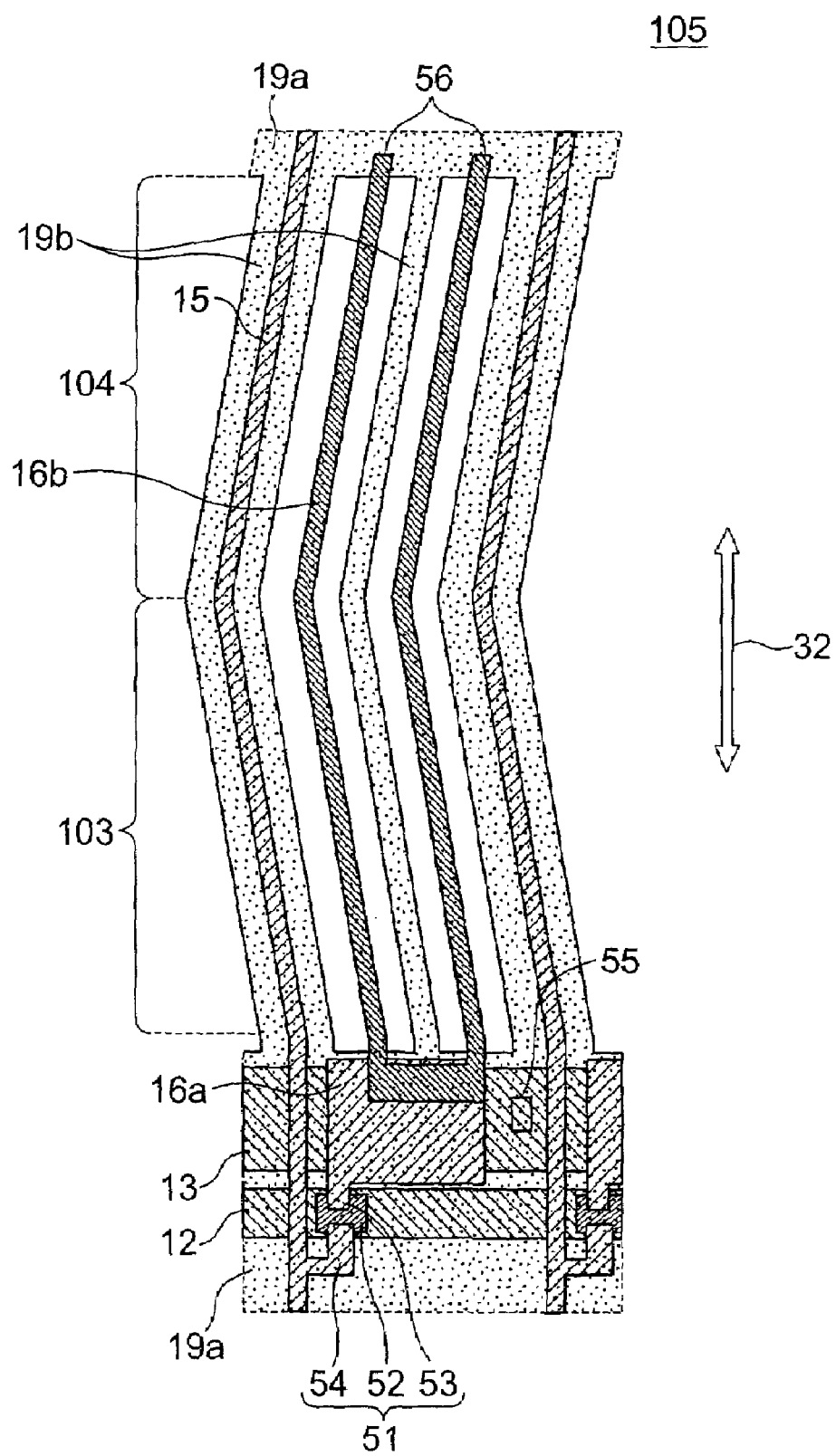
FIG. 4 is a top plan view of a LCD device according to a 20 second embodiment of the present invention.

FIG. 4 shows, similarly to FIG. 2, arrangement of electrodes in a pixel of a LCD device 105 according to a second embodiment of the present invention. In the LCD device 105 of the second embodiment, the branch lines 16b of the pixel electrode 16 is made of an. ITO film and overlies the lead portion 16a made of a metallic film. Other configurations are similar to those of the first embodiment.

The transparent branch lines 16b of the pixel electrode raises the opening ratio of the pixel, and thus improves the coefficient of utilization of the transmitted light, thereby increasing the luminance of the LCD device 105.

In manufacture of the LCD device 105 of the second embodiment, the metallic film formed on the gate insulation film is patterned to configure the lead portion 16a of the pixel electrodes excepting the branch lines 16b. The branch lines 16b are formed from ITO film overlying the lead portion 16a.

Figure 5A:
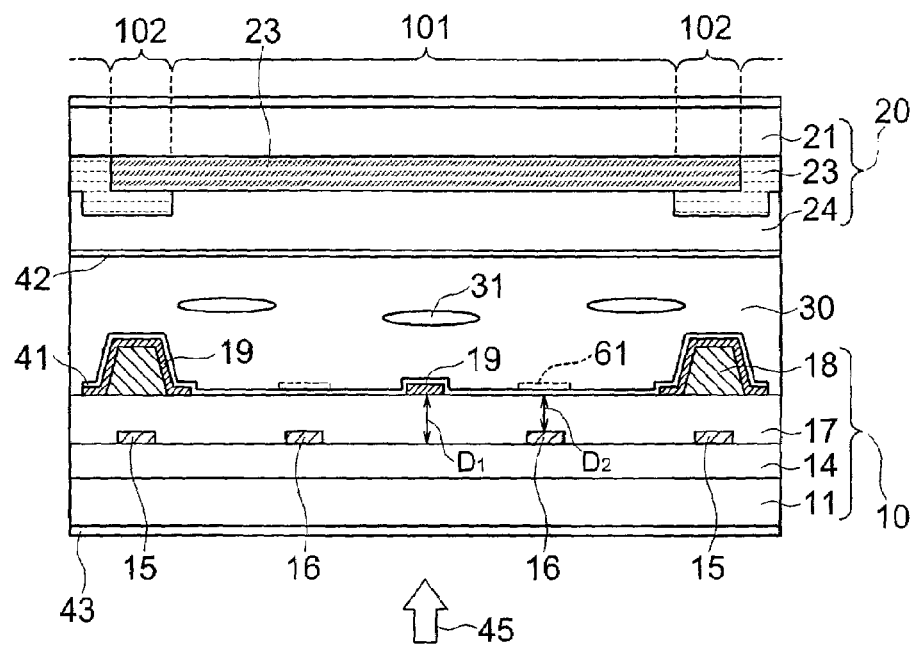
FIGS. 5A and 5B are sectional views of a LCD device according to a third embodiment of the present invention, taken along a row direction and a column direction, respectively.
Figure 5B:
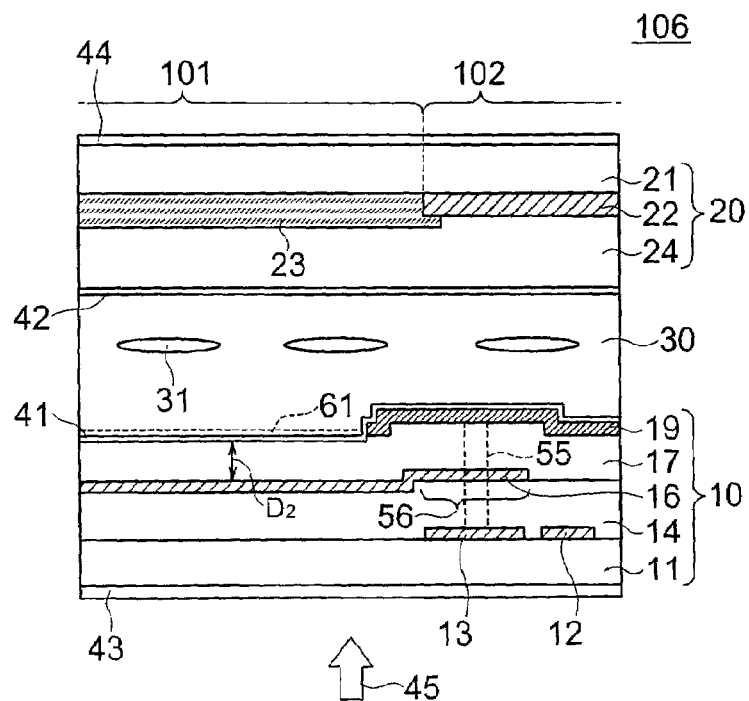

FIGS. 5A and 5B show, similarly to FIGS. 1A and 1B, a LCD device 106 according to a third embodiment of the present 20invention. In the third embodiment, the portion of the passivation film 17 in contact with the pixel electrode 16 and the vicinity thereof has a thickness (D2) smaller than the thickness (D1) of the other portion of the passivation film 17 by an amount corresponding to the thickness of the pixel electrode 16. This configuration provides a substantially flat top surface to the passivation film 17. Other configurations of the present embodiment are similar to those of the first embodiment.

The substantially flat top surface of the passivation film s 17 improves the uniformity of the orientation of the LC molecules 31, thereby improving the contrast ratio of the LCD device 106.

Figure 6A:
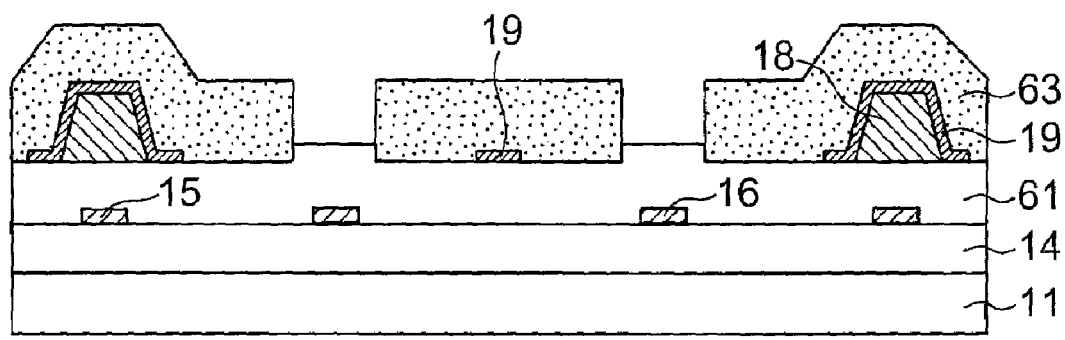
FIGS. 6A and 6B are sectional views of the LCD device of the third embodiment in consecutive steps of fabrication thereof.
Figure 6B:
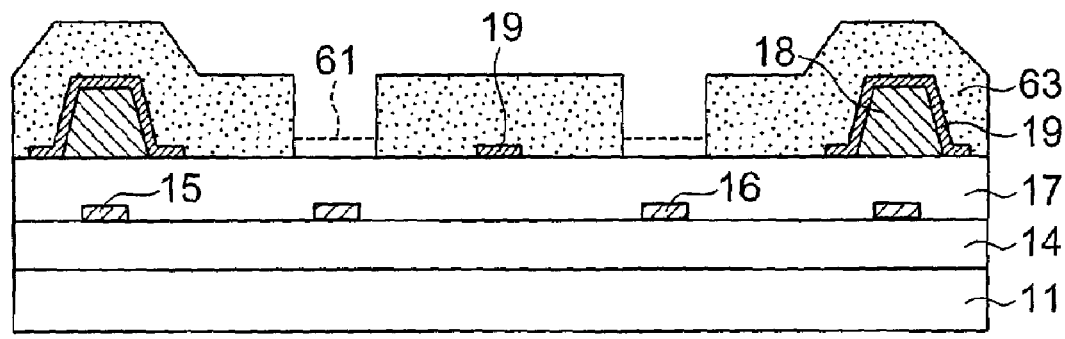
Figure 7:
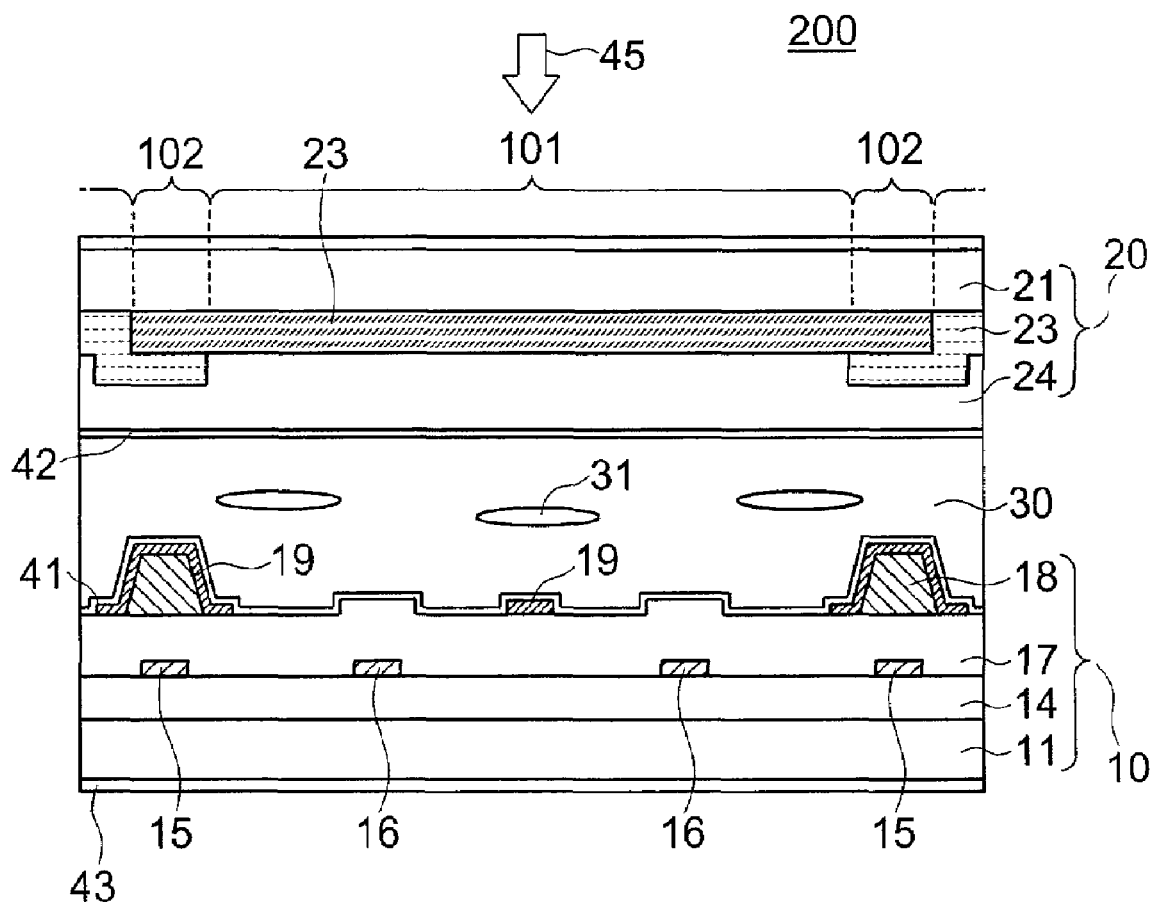
FIG. 7 is a sectional view of a conventional LCD device.
Figure 8A:
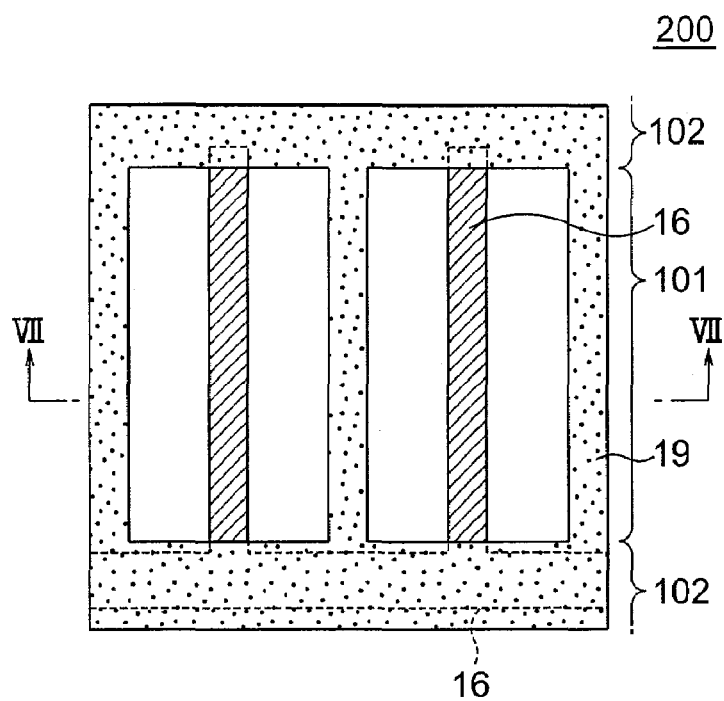
FIG. 8A is a top plan view of the conventional LCD device.
Figure 8B:
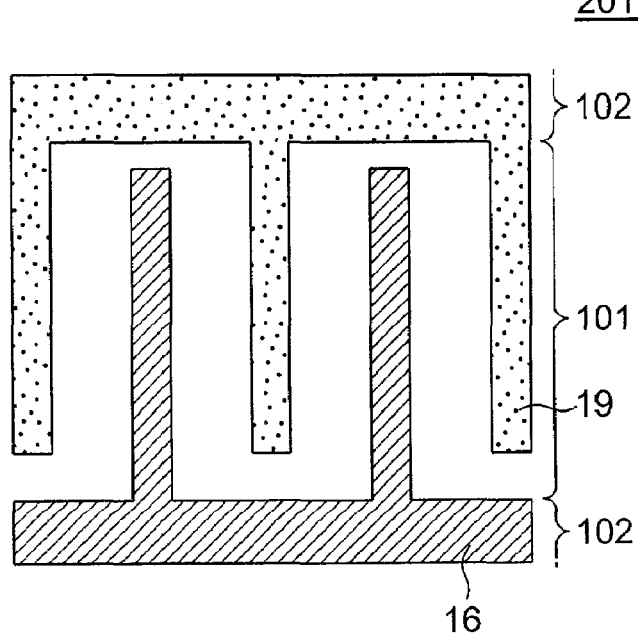
FIG. 8B is a top plan view of another conventional LCD device.

In manufacture of the LCD device 106 of the third embodiment, as shown in FIG. 6A, a resist mask 63 having an opening corresponding to the location of the common electrodes 19 and the vicinity thereof is formed on the silicon nitride film 61. Subsequently, as shown in FIG. 6B, an etching process is conducted using the resist mask 63 as an etching mask to selectively etch a portion of the silicon nitride film 61 corresponding to the opening by an amount corresponding to the thickness of the common electrodes 19. Thus, the resultant silicon nitride film 61 has a substantially flat top surface.

Since the above embodiments are described only for examples, the present invention is not limited to the above embodiments and various modifications or alterations can be easily made therefrom by those skilled in the art without departing from the scope of the present invention.

What is claimed is:

1. A liquid crystal display (LCD) device comprising a liquid crystal (LC) layer, and first and second substrates sandwiching therebetween said LC layer to define a plurality of pixels, said first substrate including a first electrode and a second electrode in each of said pixels to apply said LC layer with a lateral electric field, wherein: said first substrate mounts thereon a transparent insulation film; said first electrode is formed on a first surface of said transparent insulation film near said LC layer, said second electrode is formed on a second surface of said transparent insulation film far from said LC layer; and said transparent insulation film has a first thickness (D1) at a location in contact with said first electrode, and a second thickness (D2) smaller than said first thickness at a location in contact with said second electrode, wherein the following relationship holds: $D2<D1-40$ (nm), and wherein the first substrate further comprises a substrate body, wherein a shortest distance between the first electrode and the substrate exceeds a distance between the LC layer and the substrate body.

2. The LCD device according to claim 1, wherein said transparent insulation film has a portion in contact with both said first electrode and said second electrode, wherein said first electrode and said second electrode at least partially overlap with said portion at least partially sandwiched therebetween, and said portion of said transparent insulation film has a thickness equal to or larger than said first thickness.

3. The LCD device according to claim 1, further comprising data lines for supplying data signals to said pixels, wherein said data lines extend on said second surface of said transparent insulation film, and overlap part of said first electrode as viewed normal to said first and second surfaces.

4. The LCD device according to claim 1, wherein said first surface of said transparent insulation film is a substantially flat surface.

5. The LCD device according to claim 1, wherein said transparent insulation film further comprises a third portion in contact with neither the first electrode, nor the second electrode, wherein said third portion spans a thickness of said transparent insulation film, and wherein the thickness of said transparent insulation film at said third portion is less than said first thickness.

6. The LCD device according to claim 1, further comprising an orientation film applied uniformly on each side of the LC layer.

7. The LCD device according to claim 1, wherein the first substrate further comprises a substrate body; and a second insulation film applied between the substrate body and the second electrode.

8. A liquid crystal display (LCD) device comprising a liquid crystal (LC) layer, and first and second substrates sandwiching therebetween said LC layer to define a plurality of pixels, said first substrate including a first electrode and a second electrode in each of said pixels to apply said LC layer with a lateral electric field, wherein: said first substrate mounts thereon a transparent insulation film; said first electrode is formed on a first surface of said transparent insulation film near said LC layer, said second electrode is formed on a second surface of said transparent insulation film far from said LC layer; and said transparent insulation film has a first thickness (D1) at a location in contact with said first electrode, and a second thickness (D2) smaller than said first thickness at a location in contact with said second electrode, wherein the first substrate further comprises a substrate body, wherein a shortest distance between the first electrode and the substrate exceeds a distance between the LC layer and the substrate body.

* * * * *